United States Patent Office 3,109,023
Patented Oct. 29, 1963

3,109,023
2,3,6-TRICHLORO-5-NITROBENZOIC ACID AND SALTS THEREOF
Edward D. Weil, Niagara Falls, N.Y., assignor to Hooker Chemical Corporation, Niagara Falls, N.Y., a corporation of New York
No Drawing. Filed June 10, 1958, Ser. No. 740,992
5 Claims. (Cl. 260—515)

This invention relates to a composition of matter known as a ring chlorinated and nitrated benzoic acid.

The present invention resides in the concept of a specific position isomer of such class of substances, identified by its molecular structure as 2,3,6-trichloro-5-nitrobenzoic acid. The physical embodiment of this concept has unique properties as a selective herbicide not logically predictable from the established herbicidal properties of the known isomers in its class.

The substance can be prepared in the following manner:

Seventy-five grams of 2,3,6-trichlorobenzoic acid was refluxed for twelve hours with two hundred and fifty milliliters of red fuming nitric acid. The reaction mixture was then poured into one thousand milliliters of water, cooled to 0-5 degrees centigrade, filtered, and the solids washed with a small amount of water, then dried in air. The product comprises seventy-five grams of pale yellow crystalline solid melting at 156.5–157 degrees centigrade. After recrystallization from benzene-heptane the product melted at one hundred and fifty-seven degrees centigrade.

*Analysis.*—Calculated for $C_7H_2Cl_3NO_4$: N, 5.17. Found: N, 5.1.

The structure of the product was proved by decarboxylation to 1,2,4-trichloro-5-nitrobenzene, melting point fifty-seven to fifty-eight degrees centigrade.

It is important in agricultural practice to use a plant growth regulator which will control weeds but which will have little or no adverse effect on the crops in the treated area. The benzoic acids and related compounds that have heretofore been used have not generally exhibited this selectivity on most crops. In particular, the hitherto known benzoic herbicides cannot be used to control weeds in dicotyledonous crops because of their serious damaging effect on said crops.

The compound of this invention was found to have good herbicidal action on broadleaf weeds but produced no damaging effect on desirable grasses or soybeans. This is in contrast to the un-nitrated active tri and tetrachlorobenzoic acids which are quite damaging to most grasses and to soybeans. It was completely unexpected and, therefore, could not have been predicted that 2,3,6-trichloro-5-nitrobenzoic acid would have these unusual selective properties. Further surprising was the fact that the prior art indicated that some chloronitrobenzoic acids do not even have plant growth regulating properties.

An area of sandy loam soil naturally infested with lambsquarters, ragweed, burdock, smartweed, and pigweed were plowed, disked and planted with sweet corn, soybeans, and millet. Separate plots werethen sprayed with an emulsifiable oil formulation of 2,3,6-trichloro-5-nitrobenzoic acid and a commerical polychloronitrobenzoic acid herbicide consisting of approximately nineteen percent 2,3,6-trichlorobenzoic acid, fifty-two percent 2,3,5-trichlorobenzoic acid, eight percent 2,3,5,6-tetrachlorobenzoic acid, and twenty-one percent inert ingredients. Both compositions were applied at the rate of eight pounds per acre. A control plot was left unsprayed.

The plots were inspected after seven weeks. The unsprayed plot was heavily overgrown with broadleaf weeds, the plot treated with the commercial polychlorobenzoic acid herbicide exhibited excellent broadleaf weed control but the millet and soybeans were killed and the corn was severely injured (severe stunting and deformation. Even by reducing the rate of application to one pound per acre, the polychlorobenzoic acid still severely injured soybeans. The plot treated with 2,3,6-trichloro-5-nitrobenzoic acid exhibited excellent broadleaf weed control, but the corn, millet and soybeans were undamaged.

Derivatives of the acid of this invention may be advantageous for certain uses and if desired the ester and amide may be used. Such derivatives are prepared by reacting the free acid, or acid chloride, with alcohols or amines in the conventional manner for conducting esterification or amidation processes.

The compound of the invention can also be used for other purposes, for example, as a chemical intermediate. Reduction of the compounds depending on conditions, yields the corresponding 5-amino-, 5-hydroxylamino-, 5,5'-azo-, or 5,5'-azoxy substituted 2,3,6-trichlorobenzoic acids, which are also useful plant growth regulators.

In determining whether it is advantageous to use in the field any of the aforementioned derivatives or salts of the 2,3,6-trichloro-5-nitrobenzoic acid rather than the acid per se, one determines the field conditions and selects the particular derivative or salt having the required characteristics to meet such conditions.

The compound of this invention may be used with any conventional diluent such as clay, wood flour, fuller's earth, soybean flour, or any liquid carrier such as xylene, kerosene, alcohols and ketones or other carrier may be used, depending on the economics and distribution requirements. Formulations may contain emulsifying agents, such as sorbitol, polyoxyethylene ethers and sodium alkyl sulfate, and carriers in accordance with the well-established practices in the herbicidal field.

Examples of formulations that may be used are as follows:

Example 1

Ten parts of 2,3,6-trichloro-5-nitrobenzoic acid and five parts of a commercial polyoxyethylene ether emulsifier were dissolved in thirty parts of xylene to obtain a solution emulsifiable with water.

Example 2

One part of 2,3,6-trichloro-5-nitrobenzoic acid was agitated with fifty parts of water and four percent solution of sodium hydroxide was added until a pH of eight to nine was reached. The solution was then diluted with water to make one hundred parts of a one percent solution of the sodium salt of 2,3,6-trichloro-5-nitrobenzoic acid. This could be sprayed as such or further diluted with water to make a spray solution.

Other water-soluble salts such as the potassium salt, ammonium salt and the mono-, di-, or trialkylammonium salts may be similarly formulated and used. Combinations of this herbicide with other known herbicides or compositions for controlling the growth of vegetation and plants to obtain desirable combinations and properties are within the spirit of this invention. The compounds of this invention can be advantageously used in mixtures with other compounds capable of producing desirable rapid destruction of plants or vegetation. For example, 2,3,6-trichloro-5-nitrobenzoic acid or its soluble salts can advantageously be used in conjunction with 2,4-dichlorophenoxyacetic acid, or salts thereof, 4-chloro-2-methylphenoxyacetic acid or salt thereof, N,N-diallyl-α-chloroacetamide, N,N-diethyl-2-chloroacetamide, ethyl N,N-di-n-propylthiolcarbamate, 2-chloroallyl diethyldithiocarbamate, and others. This list is intended to be representative, and it is understood that other reasonable combinations may be used. The examples and methods of preparation disclosed have been given for purposes of illustration only and do not restrict the invention to the specifics herein illustrated. Many other modifications and ramifications will naturally suggest themselves to those skilled in the art, based on the disclosure of the basic discovery. These are intended to be comprehended within the scope of our invention.

I claim:

1. 2,3,6-trichloro-5-nitrobenzoic acid compositions selected from the group consisting of the sodium salt, the potassium salt, and the ammonium salt of 2,3,6-trichloro-5-nitrobenzoic acid, and 2,3,6-trichloro-5-nitrobenzoic acid.

2. The sodium salt of 2,3,6-trichloro-5-nitrobenzoic acid.

3. The potassium salt of 2,3,6-trichloro-5-nitrobenzoic acid.

4. The ammonium salt of 2,3,6-trichloro-5-nitrobenzoic acid.

5. 2,3,6-trichloro-5-nitrobenzoic acid.

References Cited in the file of this patent
UNITED STATES PATENTS

| | | |
|---|---|---|
| 1,832,247 | Schindhelm | Nov. 17, 1931 |
| 2,848,470 | Girard et al. | Aug. 19, 1958 |
| 2,863,754 | Wain | Dec. 9, 1958 |
| 2,898,206 | Monoogian | Aug. 4, 1959 |

OTHER REFERENCES

Mayer et al.: "Chem. Abstracts," v. 33, col. 9541 (1939).

Zimmerman et al.: Chem. Absts., vol. 46, col. 11547 (1952).